W. F. COCHRANE.
SWATH-STICK FOR MOWING-MACHINES.
No. 173,904. Patented Feb. 22, 1876.
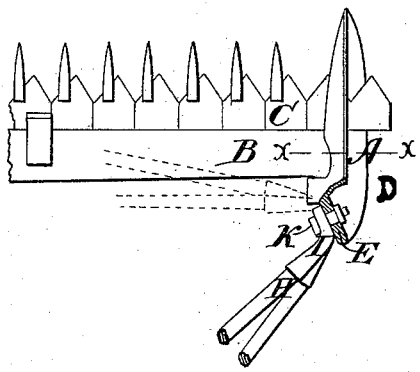
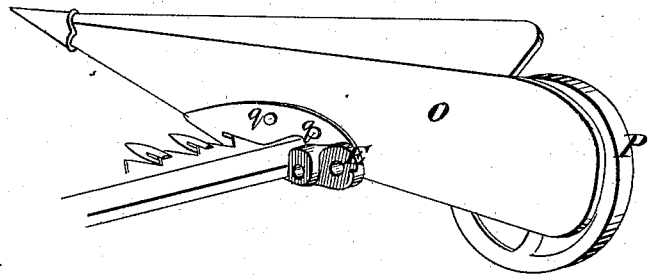
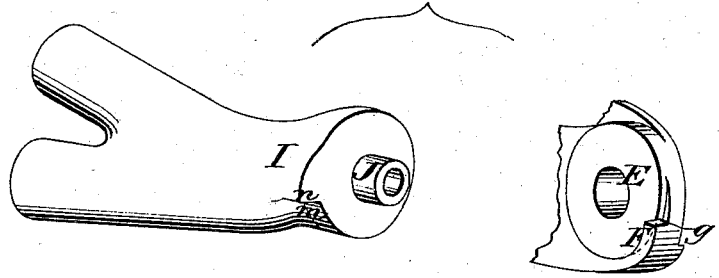
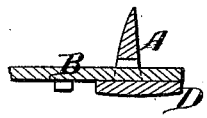
Witnesses.
Inventor
W. F. Cochrane
by his Attys.
Hill & Ellsworth

UNITED STATES PATENT OFFICE.

WILLIAM F. COCHRANE, OF LA FAYETTE, INDIANA.

IMPROVEMENT IN SWATH-STICKS FOR MOWING-MACHINES.

Specification forming part of Letters Patent No. 173,904, dated February 22, 1876; application filed April 20, 1874.

*To all whom it may concern:*

Be it known that I, WILLIAM F. COCHRANE, of La Fayette, in the county of Tippecanoe and State of Indiana, have invented a new and useful Grain and Grass Shoe Combined for Harvesting and Mowing Machines; and I do hereby declare the following to be a full and exact description of the same, reference being had to the accompanying drawings forming part of this specification, in which—

Figure 1 is a top-plan view of the shoe secured to a section of the finger-bar, and arranged with the swathing-sticks for operation in a mower. Fig. 2 is a perspective view, showing the shoe arranged with the divider and grain-wheel for operation in a grain-harvester. Fig. 3 is a perspective view of the socket on the swathing-sticks and shoe; and Fig. 4 is a section in the line $x\,x$, Fig 1.

Similar letters of reference in the accompanying drawings denote the same parts.

My invention has for its object to provide an improved shoe for use with both a grain and grass harvester at the outer end of the finger-bar.

To this end the invention consists in constructing the shoe with a beveled socket at its rear end, to receive a thimble upon the beveled socket of the swathing-sticks, for the purpose of holding such sticks in an oblique position to swath the cut grass, to admit of their turning when the machine is backing, so that they shall not be caught by the ground or grass and thereby broken, and to allow them to be turned up and folded over longitudinally along the cutter-bar for transportation.

In the accompanying drawings, A is the shoe, fastened to the outer end of the finger-bar B of a grain or grass harvester, and cast with an opening for the play of the sickle C. Its outer face is inclined vertically away from the finger-bar, and terminates at the base in a horizontal side flange, D, extending nearly its whole length. Its rear end, upon the inside, is cast with a socket, E, beveled vertically and horizontally, as shown. The vertical bevel is outward, but is very slight, while the plane of the horizontal bevel forms an acute angle with the axis of the shoe at the rear end. It is further cast with a narrow curved guide-flange, F, at the rear edge of the beveled socket, the upper end of which forms a shoulder, $g$. The shoe thus formed is adapted for use with a mowing-machine by simply applying the swathing-sticks H, which is effected in the following manner: The socket I, in which the two swathing-sticks are fitted, is cast with a beveled end or face, having a thimble, J, projecting from its center for the passage of a bolt. This thimble enters the socket E of the shoe, bringing the beveled faces of the two sockets to bear against each other, and in this position they are held by a bolt, K, passing through the thimble and sockets, as shown. The socket I, at the rear edge of its beveled face, is cast with a recess, $m$, having a flat-top shoulder, $n$. The guide-flange of the shoe-socket enters this recess, so that the two shoulders $g\,n$ shall bear against each other, and prevent the swathing-sticks from dropping down too far behind the finger-bar. The bevel of the two sockets is such as to hold the swathing-sticks obliquely to the finger-bar, as shown in Fig. 1, for the purpose of throwing up the cut grass into a swath in rear of the cutter-bar as the machine moves forward. The thimble J turns freely within the socket E, so that the swathing-sticks, guided by the beveled bearing-surfaces, swing or turn up easily when the machine is backed, and are, therefore, prevented from being broken by catching in the ground or in the cut grass.

When the machine is to be transported from place to place the swathing-sticks are turned up and folded over upon the finger-bar longitudinally thereof, as shown by dotted lines, Fig. 1, and are thus out of the way completely.

When the machine is to be used as a grain-harvester the swathing-sticks are removed by taking out the bolt K, and the divider O, carrying the grain-wheel P, applied by resting such divider edgewise upon the horizontal flange D, and bolting it to the vertical face of the shoe, as shown at $q\,q$, Fig. 2. The shoe is, therefore, readily adapted for use with either machine.

Having thus described my invention, what I claim as new, is—

The beveled socket E, having shoulder $g$, in combination with the beveled socket I, having shoulder $n$, and the thimble J, substantially as described, for the purposes specified.

WM. F. COCHRANE.

Witnesses:
E. A. ELLSWORTH,
N. K. ELLSWORTH.